Figure 1:
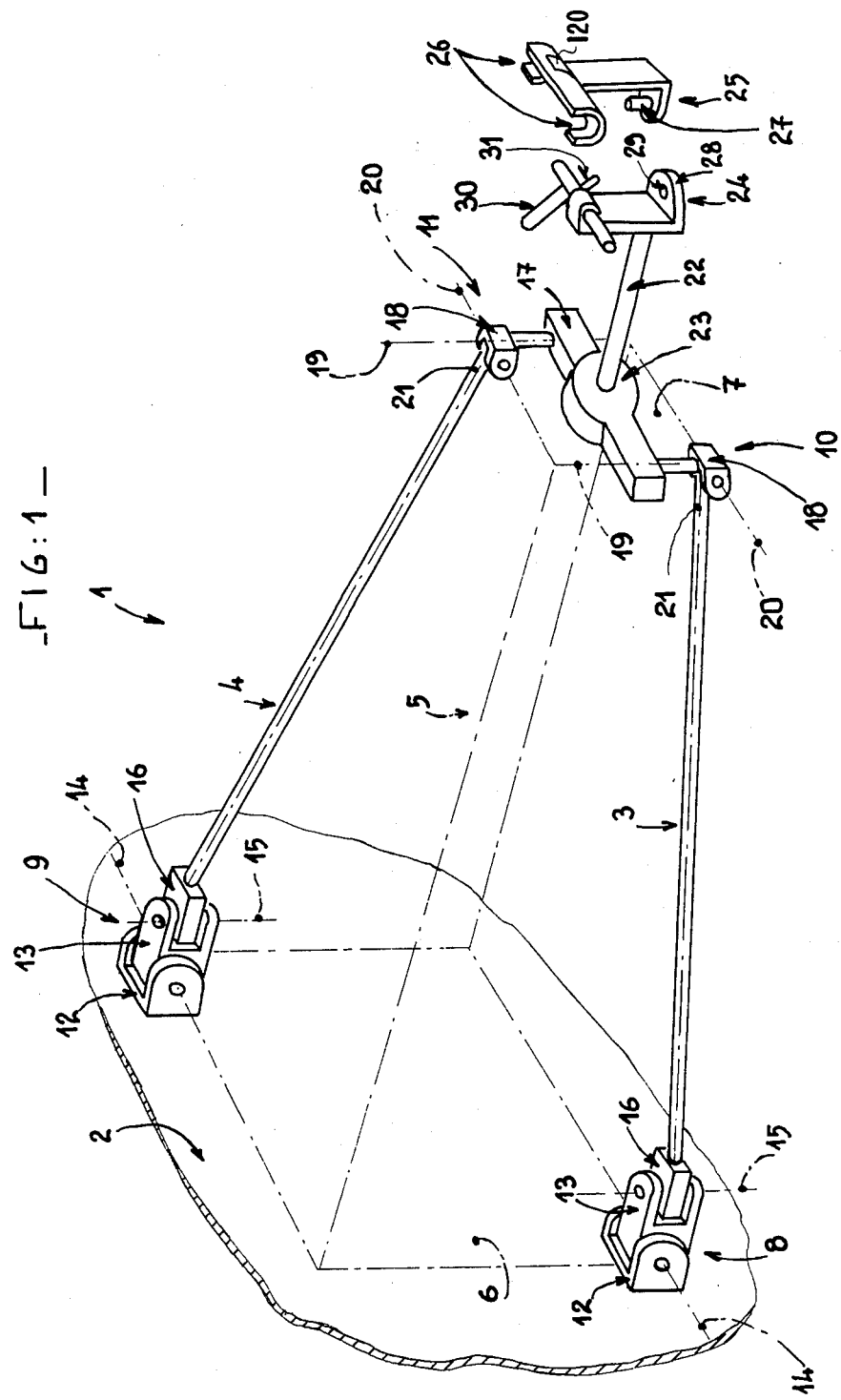

United States Patent [19]

Woestelandt

[11] Patent Number: 4,714,264

[45] Date of Patent: Dec. 22, 1987

[54] COUPLING STRUCTURE BETWEEN A TOWING VEHICLE AND A TOWED VEHICLE

[76] Inventor: Emile Woestelandt, 180 Rue Du Gal de Gaulle, 59370 Mons En Baroeul, France

[21] Appl. No.: 855,713

[22] Filed: Apr. 25, 1986

[30] Foreign Application Priority Data

Apr. 26, 1985 [FR] France ............................. 85 06808

[51] Int. Cl.$^4$ .............................................. B60D 1/14
[52] U.S. Cl. ................................ 280/456 R; 180/282; 280/461 R; 280/490 R
[58] Field of Search ........... 280/456 R, 446 R, 446 B, 280/457, 460 R, 461 R, 490 R, 493, 504, 482; 180/282, 275

[56] References Cited

U.S. PATENT DOCUMENTS

| 2,910,307 | 10/1959 | Jennings | 280/460 R |
| 3,021,154 | 2/1962 | Hedgepeth | 280/461 R X |
| 3,105,705 | 10/1963 | Richard | 280/461 R |
| 4,106,794 | 8/1978 | Sallis | 280/456 R |
| 4,262,920 | 4/1981 | Mettetal | 280/461 R X |
| 4,438,944 | 3/1984 | Della-Moretta | 280/460 R |
| 4,598,926 | 7/1986 | Gallatin | 280/461 R X |

FOREIGN PATENT DOCUMENTS

| 839901 | 5/1952 | Fed. Rep. of Germany ... 280/461 R |
| 1552857 | 1/1969 | France ............................. 280/456 R |
| 2402542 | 4/1979 | France . | |
| 2459165 | 1/1981 | France ............................. 280/446 R |
| 2559714 | 8/1985 | France ............................. 280/482 |

Primary Examiner—John J. Love
Assistant Examiner—Charles R. Watts
Attorney, Agent, or Firm—Kerkam, Stowell, Kondracki & Clarke

[57] ABSTRACT

The invention relates to a coupling structure between a towing vehicle and a towed vehicle, in particular but not exclusively between an automobile and a trailer or camping trailer.

The structure is characterized in that it includes two arms (3, 4) located substantially along the diagonally opposed corners of an imaginary truncated pyramid (5) having a rectangular base with substantially horizontal and vertical sides, and in that the two arms are articulated on the towed vehicle (2) at the level of two diagonally opposed vertices (8, 9) of the large base (6) of the imaginary truncated pyramid (5), and on the towing vehicle at the level of two corresponding diagonally opposed vertices (10, 11) of the small base (7) of the imaginary truncated pyramid (5).

23 Claims, 3 Drawing Figures

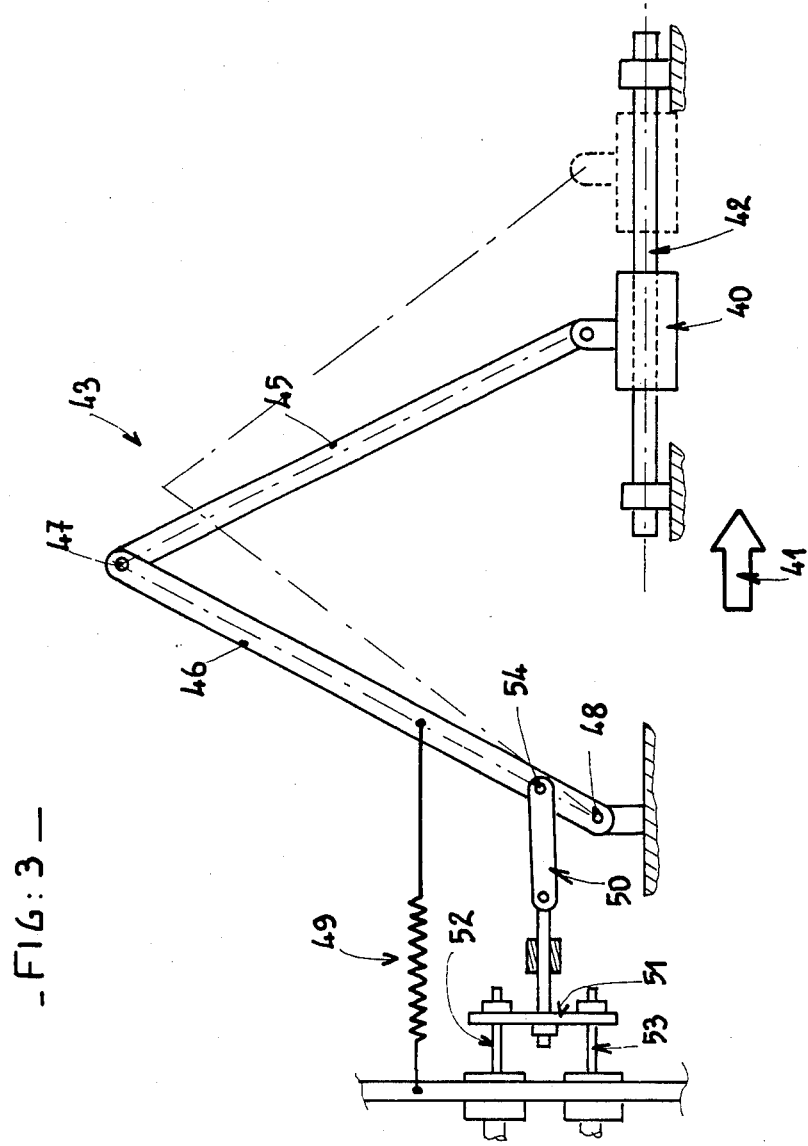
_FIG. 3_

COUPLING STRUCTURE BETWEEN A TOWING VEHICLE AND A TOWED VEHICLE

The invention relates to a coupling structure between a towing vehicle and a towed vehicle, in particular but not exclusively between an automobile and a trailer such as a camping trailer.

More specifically, the invention relates to a coupling structure which tends to damp the drifting motion, especially yawing and pitching, of the towed vehicle relative to the towing vehicle.

Coupling structures are now known which include a traditional towbar with anti-roll or anti-pitch means added.

One example of this that can be cited is the apparatus described in French Pat. No. A 2.402,542.

Such structures are complicated, however, and they are not practical for a user to install.

An anti-drift coupling towbar is also known, from French Pat. No. A 1.552,857, comprising two articulated arms arranged along the oblique sides of an isosceles trapezoid.

This apparatus produces good results, but it does not damp all the drifting motion, for example of a camping trailer relative to the vehicle towing it; in particular, it does not totally damp pitching motions.

To overcome this disadvantage, there are coupling structures which include three or four swinging arms, arranged along the corners of a pyramid having a rectangular base.

An example that can be cited is the apparatus described in U.S. Pat. Nos. 4,106,794 and 4,019,754.

An apparatus of this kind combines the respective advantages of two towbars of trapezoidal structure, one of them disposed horizontally and the other vertically, which produces good results.

Nevertheless, its pyramidal structure with a rectangular base lends it a certain complexity, so that it is difficult to install, is heavy in weight and has a high production cost.

Furthermore, the number of arms presents a problem for the braking system, especially for an inertial braking apparatus, which to be efficient must act substantially in the axis of the trailer.

The towbar that is the subject of the present invention has as its object the proposal of a structure that while functioning like a truncated pyramid is essentially quite simple to install, is relatively light in weight, and has a lower production cost.

One object of the invention is to propose a coupling structure which damps all the drifting motions of a towed vehicle with respect to the vehicle towing it, and which, despite being arranged substantially in the same manner as a structure having three or four arms arranged along the corners of a pyramid, is much more simple and more practical to use.

Another object of the invention is to propose a coupling structure to which an inertial braking apparatus can easily be adapted, with the main action of this system being located substantially in the axis of the towed vehicle.

Further objects and advantages of the present invention will become apparent from the ensuing description.

The coupling structure according to the invention is characterized in that instead of four real arms, it includes only two real arms, located substantially along the diagonally opposed corners of an imaginary truncated pyramid having a rectangular base, the sides of these rectangles, which can also be imaginary, being substantially horizontal and vertical; and in that these two real arms on the one hand converge at a point located near the rear axle of the towing vehicle and on the other hand are articulated both on the towed vehicle and on the towing vehicle at the level of the two diagonally opposed vertices of the base of the pyramid.

Figure 2:
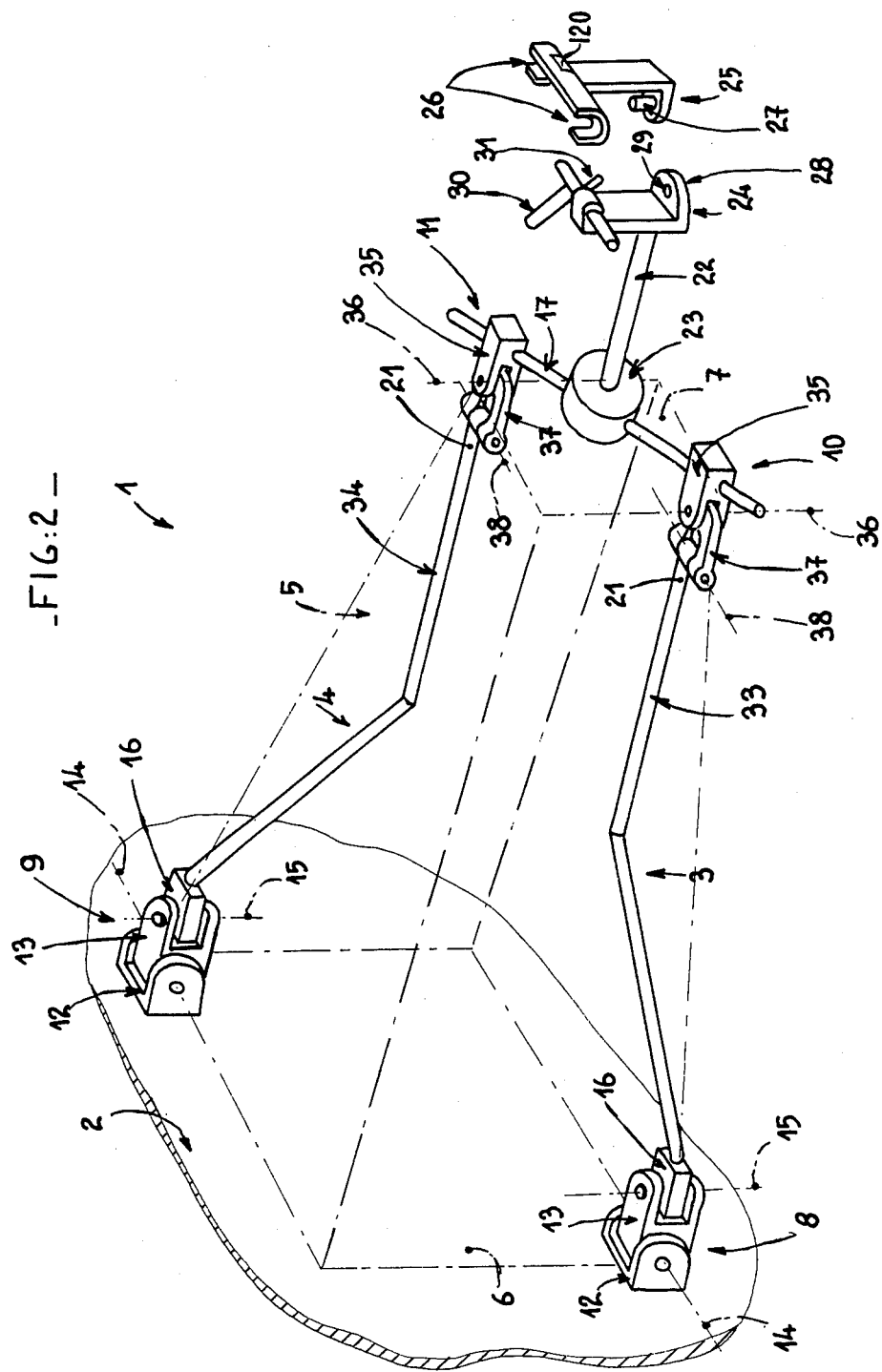

The invention will be better understood by referring to the ensuing description, made by way of non-limiting example, in conjunction with the appended drawing, which schematically shows the following:

FIG. 1, a perspective view illustrating a coupling structure according to an embodiment of the invention;

FIG. 2, a variant embodiment of the coupling structure according to the invention; and FIG. 3, an overrunning braking apparatus that can be adapted to the coupling structure according to the invention.

The coupling structure 1 shown in FIG. 1 joins a towed vehicle 2, located on the left in the drawing, to a towing vehicle located on the right in the drawing, of which only the hitch 25 of the coupling structure has been shown.

The towing vehicle and the towed vehicle are of any appropriate type; in the description that follows it will be assumed that they are an automobile and a camping trailer.

According to the invention, the coupling structure 1 joining these two vehicles is characterized in that instead of four real arms, it includes only two real arms 3, 4 located substantially along the diagonally opposed corners of an imaginary truncated pyramid 5 having a rectangular base, the sides of these rectangles, which can also be imaginary, being substantially horizontal and vertical; and in that these two real arms 3, 4 on the one hand converge at a point located near the rear axle of the towing vehicle and on the other hand are articulated both on the towed vehicle 2 and on the towing vehicle at the level of the two diagonally opposed vertices 8, 9 or 10, 11 of the base 6, 7 in question.

The truncated pyramid has been schematically drawn in dot-dash lines 5, and it has a large base 6 toward the trailer 2 and a small base 7 located toward the automobile.

Both from above and in profile, the towbar has the shape of a trapezoidal structure, the axes of the arms 3, 4 of which converge in the vicinity of the axle and thus enable the towbar both to combine the advantages of trapezoidal structures in these two planes and to function in the same manner as the towbar of a truncated pyramid having four rear arms.

At the level of the vertices 8, 9 toward the trailer 2, the real arms are articulated by any suitable means, in particular by a revolute joint, cardan joint or a joint derived from a cardan joint, that is, such as that shown in FIG. 1, having two substantially orthogonal and offset axes of articulation.

In this latter case, each joint includes for example a bracket 12 that is integral with the trailer 2 and an intermediate element 13, that is articulated with respect to the bracket 12 about a horizontal axis 14 and in turn has a substantially vertical axis of articulation 15, which is offset relative to the automobile, for the end 16 of the connecting arm.

Toward the towed vehicle, one again any suitable means may be used.

For example, in the plane of the small base 7 of the imaginary truncated pyramid 5, FIG. 1 shows a horizontal towbar 17, which at each of its ends, toward the bottom and toward the top, has a bracket 18 articulated with respect to the towbar 17 about a substantially vertical axis of rotation 19 and also having a substantially horizontal axis of articulation 20 for the end 21 of the connecting arm.

Preferably, there are means enabling regulation of the horizontal distance between the two diagonally opposed vertices 10 and 11 of the small base 7 of the imaginary truncated pyramid, that is, between the two brackets 18 on the towbar 17.

These means are for example a plurality of mounts for the brackets 18, distributed symmetrically along the length of the towbar 17.

Furthermore, there are also means enabling regulation of the vertical height between the vertices 10 and 11, that is, between the horizontal axes of articulation 20 of the two brackets 18.

These means, for example, enable regulating the height of the axes of articulation 20 symmetrically with respect to the towbar 17.

The means of regulating the vertical and horizontal distance of the articulation points of the rear arms 3 and 4 at the level of the vertices 10, 11 thereby enable modification of the geometry of the imaginary truncated pyramid 5, and more specifically of the complete pryamid, by displacing its vertex.

The optimum in driving convenience is attained when the vertex of the imaginary pyramid is located substantially on the level of the rear axle of the towing vehicle.

The coupling structure of the invention also includes any suitable means for securing it to the towing vehicle.

These means are shown in FIG. 1 in the form of a towbar rod 22, which is substantially horizontal and connected to the middle of the bar 17, in particular via a shock-absorbing block 23 which absorbs the misalignment brought about by a rolling movement of the trailer 2 relative to the vehicle.

This shock-absorbing block 23 is preferred whenever the joints of the arms are of the cardan type or are derived from the cardan type.

When the joints are of the revolute type, the shock-absorbing block is unnecessary, and in that case the connection may be rigid.

The end having the towbar rod 22 includes by way of example a securing device 24 which is generally in the shape of an approximately vertical T, the vertical member of which is elongated toward the front by a substantially horizontal plate 28 pierced by an opening 29 having a substantially vertical axis.

Toward the towing vehicle, the securing hitch 25 which receives the securing device 24 has two hooks 26 in its upper portion for each end of the horizontal member of the securing device 24 and a pin 27 having a vertical axis, onto which the opening 29 is slipped.

The device 24 can be locked in the hitch 25 particularly by using a lever articulated about the horizontal member of the securing device 24 and including a handle 30 toward the trailer 2, and a slide 31 toward the securing hitch, the slide engaging a detent or opening 120 in this and may may also include suitable means for assuring proper securing hitch 25, locking.

Manipulating the handle 30 facilitates inserting the securing device 24 into the hitch 25, to lock it, and removing the device 24 from the hitch 25, to unlock it.

Naturally any other suitable securing means and any other suitable locking means may also be used.

FIG. 2 shows a variant structure 1 having two real arms 3 and 4 which are bent such as to have on portion that is substantially parallel, here 33 and 34 respectively, over at least part of their length.

In this figure, the parallel portions 33 and 34 of the real arms 3 and 4 are situated toward the joint attaching them to the towing vehicle.

The joints of the bent arms 3 and 4 towrad the trailer 2 and the towing vehicle are still located at the level of the diagonally opposed vertices 8 and 9, 10 and 11 of the large base 6 and small base 7 of the imaginary truncated pyramid 5.

Another variant shown in this figure is an oblique towbar 17, located in the plane of the small base 7 of the truncated pyramid 5 and directly connecting the two vertices 10, 11.

The articulation of the ends of the rear amrs 3, 4 to the towbar 17 is done in this case, by way of example, by means of a bracket 35 connected integrally with the towbar 17 and having for example a substantially vertical axis of rotation 36 for an intermediate element 37, on which the end 21 of the arm is rotationally articulated about a substantially horizontal axis 38.

In an advantageous manner, the spacing apart of the two brackets 35 may be regulated on the towbar 17 by the symmetrical displacement of the brackets along this bar, so as to modify the geometry of the imaginary truncated pyramid to suit the type of vehicle involved.

The articulation of the real arms 3 and 4 at the level of the vertices 8, 9 is effected substantially identically to what is described above.

Naturally a revolute joint attaching the arms 3, 4 to the trailer 2 and to the towing vehicle may also be suitable for this variant.

As compared with the conventional structure having two arms arranged along the oblique sides of a trapezoid, the present structure has the advantage of also damping pitching motion of the trailer 2 relative to the towing vehicle.

As compared with a structure having three or four arms, the present structure behaves substantially identically, with the advantage that it has only two real articulated arms, which is simpler to make and simpler to use.

Furthermore, an inertial braking apparatus can be adapted to the structure according to the invention.

Any appropriate apparatus is suitable, such as a conventional inertial braking apparatus with a telescoping control device integrated into the towbar rod 22, between the securing device 24 and the towbar 17.

In like manner, an apparatus including two telescoping control elements, such as hydraulic jacks, can also be adapted to the structure according to the invention.

Each of these telescoping element is arranged along one connecting arm 3, 4, being arranged in in the parallel portion 33, 34 in the case where the arms are bent.

The two telescoping elements are connected to an auxiliary control device, which in the event of vehicle braking causes them to retract in a substantially identical manner and which controls the braking apparatus for the trailer itself.

Accordingly, no matter what angle is formed by the trailer and the towing vehicle, the braking efficiency is substantially constant.

Another braking apparatus is shown in FIG. 3.

This apparatus is located on a level with the frame of the trailer, or under it, by way of example.

It includes an inertial mass 40 that is translatable parallel to the direction of forward movement 41 of the trailer.

By way of example, the inertial mass 40 is guided along a tube 42.

Naturally any other guide means may be used, such as two parallel tubes or a guide groove or any other suitable means.

The inertial mass 40 is connected to a lever 43 which includes two arms 45, 45 articulated to one another at 47 at one of their ends, the other end of the arm 45 being moreover articulated to the flyweight mass 40 and the other end of the arm 46 being articulated at 48, for example, to the frame of the trailer.

In addition, an optional return spring 49 elastically returns the articulated lever 43 to its bent position, that is, its travel position.

By way of a rocker bar 50 and a linking element 51, for instance, the articulated lever 43 controls the two wheel brake controls 52, 53 for each side of the trailer.

The efficiency of this braking apparatus can be regulated by adjusting the weight of the inertial mass 40, optionally by interposing a hydraulic shock absorber between the inertial mass 40 and the frame, by regulating the other return spring 49 and by adjusting the position of the point of traction 54 where the rocker bar 50 engages the lever 43.

Any other braking apparatus may be used for the coupling structure.

It is understood that the present description is provided solely by way of illustrative example and the invention may be embodied in variant ways without departing from the scope thereof.

What is claimed is:

1. A coupling structure adapted to be used between a towing vehicle and a towed vehicle to damp drifting motions, such as yawing and pitching, of the towed vehicle relative to the towing vehicle, said coupling structure comprising only two real arms (3, 4) located substantially along diagonally opposed corners of an imaginary truncated pyramid (5) having imaginary spaced rectangular bases (6, 7), a first imaginary rectangular base (6) being larger than a second imaginary rectangular base (7), the rectangular bases having imaginary sides which are disposed to be substantially horizontal and vertical, said two real arms (3, 4) further being disposed substantially along two diagonally opposed edges of an imaginary pyramid having a vertex at a point located near a rear axle of the towing vehicle, said real arms being articulated at points both on the towed vehicle (2), at two diagonally opposed vertices (8, 9) of the large base (6), and at an end nearest the towing vehicle at of two diagonally opposed vertices (10, 11) of the small base (7) of the imaginary truncated pyramid.

2. A structure as defined by claim 1, further including means for regulating the horizontal distance between the two points of articulation of the real arms (3, 4) toward the towing vehicle.

3. A structure as defined in claim 2 wherein the two real arms (3, 4) are bent and are parallel (33, 34) over at least a portion of their length.

4. A structure as defined by claim 2 wherein the real arms (3, 4) are joined by articulation with a towbar (17), said towbar adapted to be connected in turn to the towing vehicle with a towbar rod (22) terminated by a securing device (24).

5. A structure as defined by claim 1, further including means for regulating the vertical distance between the two points of articulation of the real arms (3, 4) toward the towing vehicle.

6. A structure as defined in claim 5 wherein the two real arms (3, 4) are bent and are parallel (33, 34) over at least a portion of their length.

7. A structure as defined by claim 5 wherein the real arms (3, 4) are joined by articulation with a towbar (17) said towbar adapted to be connected in turn to the towing vehicle with a towbar rod (22) terminated by a securing device (24).

8. A structure as defined in claim 1 wherein the two real arms (3, 4) are bent and are parallel (33, 34) over at least a portion of their length.

9. A structure as defined by claim 8 wherein the real arms (3, 4) are joined by articulation with a towbar (17) said towbar adapted to be connected in turn to the towing vehicle with a towbar rod (22) terminated by a securing device (24).

10. A structure as defined by claim 1 wherein the real arms (3, 4) are joined by articulation with a towbar (17) said towbar adapted to be connected in turn to the towing vehicle with a towbar rod (22) terminated by a securing device (24).

11. A structure as defined by claim 10 wherein the towbar (17) is substantially horizontal and includes at the level of each of its ends, one toward the top and one toward the bottom, two articulation brackets (18) for the ends (21) of the real arms (3, 4).

12. A structure as defined by claim 10 wherein the towbar (17) lies in a plane parallel to the plane of the smaller base (7) of the imaginary truncated pyramid (5), is inclined with respect to said substantially horizontal and vertical sides of said base, and has at the level of each of its ends an articulation bracket (35) for the end (21) of each arm (3, 4), the bracket being connected integrally with and being adjustable along the towbar (17).

13. A structure as defined by claim 10 wherein the towbar rod (22) has, at its end located toward the towing vehicle, a securing device (24) said securing device having two horizontal members which are adapted to be lodged in two hooks (26) of a securing hitch (25), said securing hitch being integral with the towing vehicle, said securing device (24) further having a vertical member said vertical member having, at a lower end, a substantially horizontal plate (28) pierced by an opening (29) which is adapted to engage a pin (27) of the securing hitch (25).

14. A structure as defined in claim 13 further including locking means disposed on said horizontal members of the securing device (24), said horizontal members adapted to rotate about a horizontal axis, said locking means having a manipulating handle (30) and a slide (31) disposed to engage a detent (120) in the securing hitch (25) when said horizontal members are rotated using said handle.

15. A trailer towing device comprising, in combination, a coupling structure adapted to be used between a towing vehicle and a towed vehicle to damp drifting motions, such as yawing and pitching, of the towed vehicle relative to the towing vehicle, said coupling structure further comprising only two real arms (3, 4) located substantially along diagonally opposed corners of an imaginary truncated pyramid (5) having imaginary spaced rectangular bases (6, 7), a first imaginary rectangular base (6) being larger than a second imaginary rectangular base (7), the rectangular bases having imaginary sides which are disposed to be substantially horizontal and vertical, said two real arms (3, 4) further being disposed substantially along two diagonally opposed corners of an imaginary pyramid having a vertex at a point near a rear axle of the towing vehicle, said real arms being articulated at points both on the towed vehicle (2) at two diagonally opposed vertices (8, 9) of the large base (6) and at an end nearest the towing vehicle at two diagonally opposed vertices (10, 11) of the small base (7) of the imaginary truncated pyramid; and means for controlling braking of the towed vehicle, said controlling means being disposed on or under a frame of the towed vehicle, said controlling means comprising:

an inertial mass (40) oriented substantially along a longitudinal axis of said towed vehicle, said mass being translatable parallel to said axis relative to said towed vehicle, an articulated lever, a first arm of said lever being connected to said inertial mass, a second arm of said lever being connected to a linking means for operatively linking said second arm of said lever to a wheel brake control means, said linking means including a rocker arm (50), said wheel brake control means being operatively connected to wheel brakes of the trailer, whereby when said inertial mass is translated toward the towing vehicle, said articulated lever and said linking means operate to cause said wheel brake control means to apply a braking force to wheels of said towed vehicle.

16. A trailer towing device according to claim 15 herein said coupling structure further includes a means for regulating a horizontal distance between the two points of articulation of the real arms (3, 4) toward the towing vehicle.

17. A trailer towing device according to claim 15 wherein said coupling structure further includes a means for regulating a vertical distance between the two points of articulation of the real arms (3, 4) toward the towing vehicle.

18. A trailer towing device according to claim 15 wherein said two real arms (3, 4) of said coupling structure are bent and parallel over at least a portion of their length.

19. A trailer towing device according to claim 15 wheein said real arms (3, 4) of said coupling device are joined by articulation with a towbar (17), said towbar adapted to be connected in turn to the towing vehicle with a towbar rod (22) terminated by a securing device (24).

20. A trailer towing device according to claim 19 wherein said towbar (17) is substantially horizontal and includes at the level of each of its ends, one toward the top and one toward the bottom, two articulation brackets (18) for the ends (21) of the real arms (3, 4).

21. A trailer towing device according to claim 19 wherein the towbar (17) lies in a plane parallel to the plane of the smaller base (7) of the imaginary truncated pyramid (5), is inclined with respect to said substantially horizontal and vertical sides of said base, and has disposed at each of its ends an articulation bracket (35) for the end (21) of each arm (3, 4), the bracket being connected integrally with and being adjustable along the towbar (17).

22. A trailer towing device according to claim 19 wherein the towbar rod (22) has, at its end located toward the towing vehicle, a securing device (24), said securing device having two horizontal members which are adapted to be lodge in two hooks (26) of a securing hitch (25), said securing hitch being integral with the towing vehicle, said securing device (24) further having a vertical member, said vertical member having, at a lower end, a substantially horizontal plate (28) pierced by an opening (29) which is adapted to engage a pin (27) of the securing hitch (25).

23. A trailer towing device according to claim 22 further including locking means disposed on said horizontal members of the securing device (24), said horizontal members adapted to rotate about a horizontal axis, said locking means having a manipulating handle (30) and a slide (31) disposed to engage an opening in the securing hitch when said horizontal members are rotated using said handle.

* * * * *

UNITED STATES PATENT AND TRADEMARK OFFICE
CERTIFICATE OF CORRECTION

PATENT NO. : 4,714,264
DATED : December 22, 1987
INVENTOR(S) : Woestelandt et al It is certified that error appears in the above-identified patent and that said Letters Patent is hereby corrected as shown below:

Claim 1, line 56 delete --of--
Claim 16, line 36 "herein" should be --wherein--
Claim 19, line 6 "wheein" should be --wherein--

Signed and Sealed this

Twenty-first Day of March, 1989

Attest:

DONALD J. QUIGG

Attesting Officer

Commissioner of Patents and Trademarks